United States Patent
Hernacki et al.

(10) Patent No.: US 8,281,363 B1
(45) Date of Patent: Oct. 2, 2012

(54) METHODS AND SYSTEMS FOR ENFORCING NETWORK ACCESS CONTROL IN A VIRTUAL ENVIRONMENT

(75) Inventors: Brian Hernacki, San Carlos, CA (US); Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1179 days.

(21) Appl. No.: 12/059,725

(22) Filed: Mar. 31, 2008

(51) Int. Cl.
H04L 29/06 (2006.01)

(52) U.S. Cl. ........... 726/2; 726/1; 726/3; 726/4; 726/27; 709/225; 709/226; 713/150; 713/154; 713/155

(58) Field of Classification Search .................. None
See application file for complete search history.

(56) References Cited

U.S. PATENT DOCUMENTS

| | | | | |
|---|---|---|---|---|
| 6,510,448 B1 * | 1/2003 | Churchyard | ................ | 718/108 |
| 7,249,187 B2 | 7/2007 | Sobel et al. | | |
| 7,318,100 B2 * | 1/2008 | Demmer et al. | ............. | 709/229 |
| 7,568,203 B2 * | 7/2009 | Dotan et al. | ................ | 719/328 |
| 7,603,719 B2 * | 10/2009 | Thomas et al. | ................ | 726/29 |
| 7,747,730 B1 * | 6/2010 | Harlow | ......................... | 709/224 |
| 7,792,990 B2 * | 9/2010 | Gooch et al. | .................. | 709/238 |
| 7,802,000 B1 * | 9/2010 | Huang et al. | .................. | 709/228 |
| 7,827,545 B2 * | 11/2010 | Choe et al. | .................... | 717/168 |
| 7,852,789 B2 * | 12/2010 | Satterlee et al. | ............... | 370/255 |
| 8,010,679 B2 * | 8/2011 | Low et al. | ...................... | 709/227 |
| 8,136,149 B2 * | 3/2012 | Freund | ............................. | 726/11 |
| 8,146,080 B2 * | 3/2012 | Carter et al. | ....................... | 718/1 |
| 2005/0132367 A1 * | 6/2005 | Tewari et al. | ....................... | 718/1 |
| 2006/0004662 A1 * | 1/2006 | Nadalin et al. | .................. | 705/50 |
| 2006/0075140 A1 | 4/2006 | Sobel et al. | | |
| 2007/0204166 A1 * | 8/2007 | Tome et al. | .................... | 713/182 |
| 2007/0204347 A1 * | 8/2007 | Caceres et al. | .................. | 726/25 |
| 2007/0300220 A1 * | 12/2007 | Seliger et al. | ...................... | 718/1 |
| 2007/0300221 A1 * | 12/2007 | Hartz et al. | ........................ | 718/1 |
| 2008/0225875 A1 * | 9/2008 | Wray et al. | ................... | 370/419 |
| 2009/0094316 A1 * | 4/2009 | Chen et al. | ...................... | 709/203 |
| 2009/0106347 A1 * | 4/2009 | Harwood et al. | ............. | 709/203 |
| 2009/0241194 A1 * | 9/2009 | Thomas | ........................... | 726/24 |
| 2009/0300605 A1 * | 12/2009 | Edwards et al. | .................. | 718/1 |
| 2011/0145886 A1 * | 6/2011 | McKenzie et al. | ................. | 726/1 |
| 2011/0225624 A1 * | 9/2011 | Sawhney et al. | .................. | 726/1 |
| 2012/0151070 A1 * | 6/2012 | Li | ................................. | 709/227 |

\* cited by examiner

*Primary Examiner* — Syed A. Zia
(74) *Attorney, Agent, or Firm* — Advantedge Law Group (57) ABSTRACT

A computer-implemented method may include receiving a request to access a network. The request may be sent from a virtual machine. The method may also include proxying the request to a network-access-control module, receiving a response from the network-access-control module, and transmitting the response to the virtual machine. Proxying the request to the network-access-control module may include assigning the virtual machine a virtual identifier. Proxying the request may also include creating a temporary interface. The temporary interface may be programmed to receive the response from the network-access-control module and transmit the response to the virtual machine. Various other methods, systems, and computer-readable media are also disclosed herein.

20 Claims, 7 Drawing Sheets

METHODS AND SYSTEMS FOR ENFORCING NETWORK ACCESS CONTROL IN A VIRTUAL ENVIRONMENT

CROSS REFERENCES TO RELATED APPLICATIONS

This application is related to U.S. Application No. 2006/0075140 filed 9 Nov. 2005 and titled "Client Compliancy in a NAT Environment", U.S. Pat. No. 7,249,187 filed 27 Nov. 2002 and titled "Enforcement of Compliance with Network Security Policies", and U.S. Application No. 2006/0070129 filed 9 Nov. 2005 and titled "Enhanced Client Compliancy Using Database of Security Sensor Data", the disclosures of each of which are incorporated, in their entirety, by this reference.

BACKGROUND

Traditional computing devices are only designed to run a single operating system, but virtualization may allow a single computer to run multiple operating systems at the same time. Virtualization may also provide many other features that optimize the use of computer and network resources. As the popularity of virtualization grows, so does the need to account for and manage virtual machines in network environments.

Virtualized environments may present challenges to many security mechanisms, especially those that may make assumptions about the atomicity of a particular host. While security infrastructures may use end-point enforcement (e.g., data loss prevention, behavior monitoring, etc.) to limit what can be done on the host, security infrastructures may not be designed to effectively control the use of virtualization technologies. Host system policies may be difficult to apply to virtual machines. In some situations, a virtual machine may be treated as a single process. The virtual machine may appear compliant from an external perspective, but may not be compliant internally.

When a host operates in a mode where the host system and a virtual machine running on the host act as completely separate network endpoints (e.g., in a bridged configuration), network access control may be applied to the host and virtual machine independently. However, if the virtual machine accesses the network in other ways, network access control may be ineffective with respect to the virtual machine. For example, the host may proxy the virtual machine's access to a network. If the host has already been authenticated and passed network access control inspection, network traffic may be allowed from the virtual machine running on the host regardless of the configuration of the virtual machine. As a result, a non-compliant virtual machine may bypass network access control restrictions and may compromise network security.

SUMMARY

Embodiments of the present disclosure may provide methods and systems for enforcing network access control in virtual environments. For example, a proxy agent on a host computing device may receive a request to access a network from a virtual machine. The proxy agent may send the request to a network-access-control module. The network-access-control module may determine whether the virtual machine complies with network policies by communicating with the virtual machine through the proxy agent.

In some embodiments, sending the request to the network-access-control module may comprise assigning the virtual machine a virtual identifier. The virtual identifier may comprise an identifier of the host computing device and an extension to the host computing device identifier. The host computing device identifier may comprise a Media Access Control (MAC) address of the host computing device.

In other embodiments, the host computing device may create a temporary interface. The temporary interface may be configured to facilitate communications between the network-access-control module and the virtual machine. In some embodiments, creating the temporary interface may comprise temporarily binding the virtual machine to a new MAC address.

According to various embodiments, an access-control-enforcement agent may receive a request from a virtual machine to access a network. The access-control-enforcement agent may determine a network access policy for the network and may enforce the network access policy on the first virtual machine. The network may be a virtual network, and a request from the first virtual machine may be a request to communicate with a second virtual machine. In other embodiments, the network may be a physical network.

Enforcing the network access policy on the first virtual machine may comprise determining whether the first virtual machine is compliant with network access policy. The access-control-enforcement agent may allow the first virtual machine to access the network if the first virtual machine is compliant with the network access policy. The access-control-enforcement agent may deny the first virtual machine access to the network if the first virtual machine is not compliant with the network access policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure is directed to enforcing network-access control in virtual environments. For example, a network-access-control module may support a direct interface with virtual machines. In a direct-interface implementation, a host of a virtual machine may assign the virtual machine a virtual identifier, which may be used in communications with the network-access-control module. In other embodiments, the network-access-control module may not support a direct interface with the virtual machine. When a direct interface is not supported, a host of the virtual machine may create a temporary interface for communications between the virtual machine and the network-access-control mechanism. Various embodiments may also apply network-access-control policies to communications between two virtual machines. As discussed in greater detail below, the systems and methods disclosed herein may provide various other features and advantages.

Figure 1:
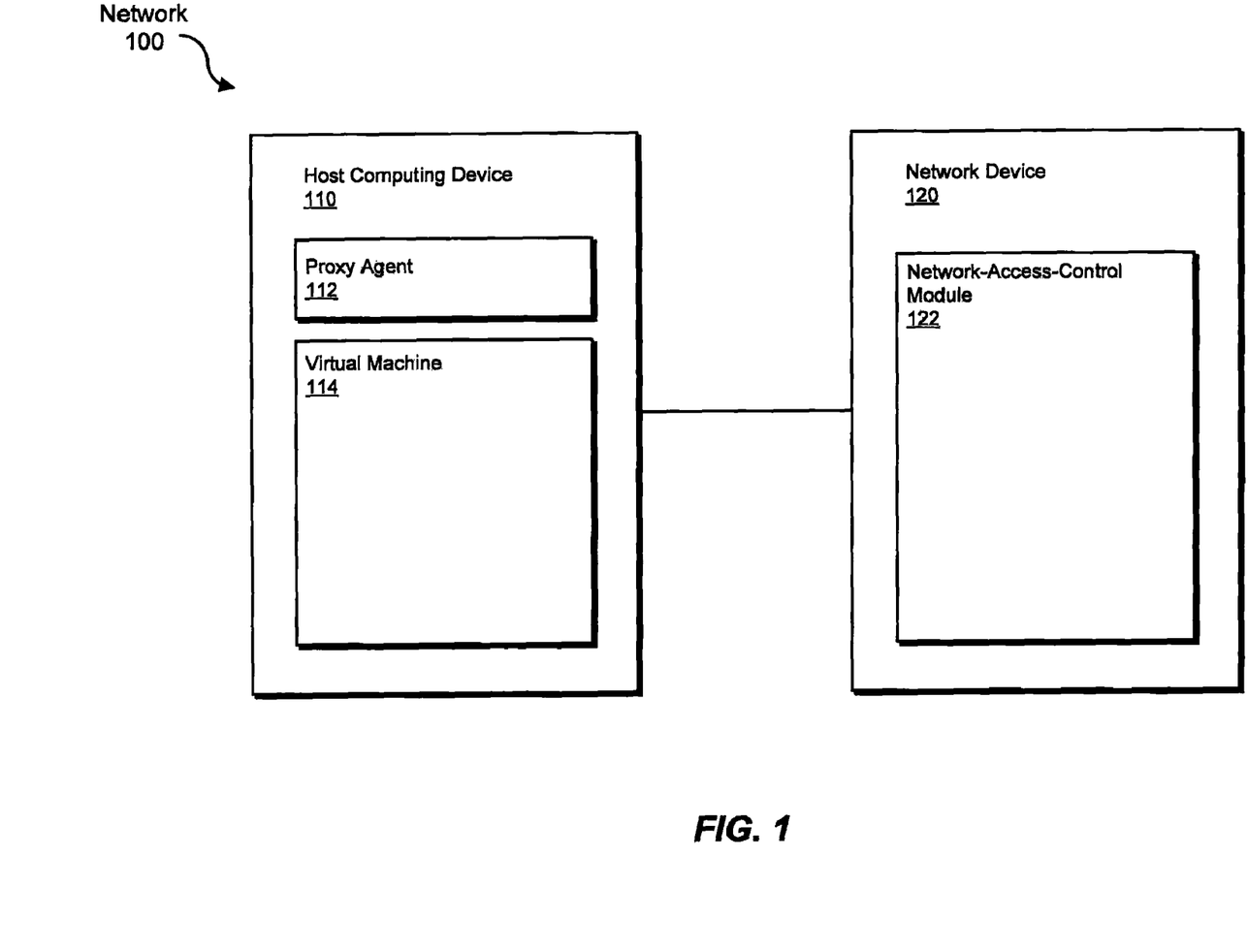
FIG. 1 is a block diagram of an exemplary network according to certain embodiments.

FIG. 1 illustrates an exemplary network 100 in which network-access-control is applied. Network 100 may include a host computing device 110 that communicates with a network through a network device 120. Host computing device 110 may be a desktop computer, a laptop computer, a portable computing device, or any other computing device capable of executing a virtual machine. Network device 120 may be a router, a server, or any other network gateway or device capable of providing network access control.

Host computing device 110 may include a proxy agent 112 and a virtual machine 114. Virtual machine 114 may be any software that creates a virtualized environment between hardware of a host computing system and an operating system. Virtual machine 114 may provide a layer of abstraction between the host computing device and the software running on the virtual machine. Numerous virtual machines may run on a single host computing device. Thus, virtual machines may enable the multiplexing of the hardware of host computing device 110. Virtual machines may also be referred to as simulated computers because virtual machines may run on a host computer but may behave as though they are separate computer from the host computer. A virtual machine may be completely defined and implemented in software rather then hardware.

Proxy agent 112 may be any application, module, or other computer-executable code programmed to manage communications between virtual machine 114 and network-access-control module 122. While FIG. 1 shows proxy agent 112 to be independent from virtual machine 114, in other embodiments, proxy agent 112 may be a part of virtual machine 114. Network-access-control module 122 may be any application, module, or other computer-executable code capable of implementing access control.

Proxy agent 112 may proxy network communications from virtual machine 114. In some embodiments, network-access-control module 122 may support direct interface with virtual machines. In such embodiments, proxy agent 112 may receive a request to access a network. Proxy agent 112 may assign a virtual identifier to virtual machine 114. The virtual identifier may be an identifier associated with host computing device 110 along with an extension to the identifier of host computing device 110.

The virtual identifier may comprise a MAC address of a network adapter of host computing device 110 along with an extension to the MAC address. For example, if the MAC address of host computing device 110 is 00-B0-D0-67-BB-F2, proxy agent 112 may create a virtual identifier for virtual machine 114 by adding an extension, such as "01", to the MAC address of host computing device 110. Thus, the virtual identifier for virtual machine 114 may have a value of 00-B0-D0-67-BB-F2-01. Any other suitable extension or modification to a MAC address may also be used as a virtual identifier of virtual machine 114. Proxy agent 112 may assign different extensions to each virtual identifier of virtual machines when multiple virtual machines are running on host computing device 110. For example, a second virtual machine may be assigned the virtual identifier 00-B0-D0-67-BB-F2-02. In other embodiments, an identifier other then a MAC address of host computing device 110 may be used to create virtual identifiers for virtual machines.

Proxy agent 112 may relay the request to access the network from virtual machine 114 to network-access-control module 122. Proxy agent 112 may include the virtual identifier in the request that is relayed to network-access-control module 122. Network-access-control module 122 may use the virtual identifier to identify virtual machine 114 and may initiate an authentication process or any other network access control function on virtual machine 114. Network-access-control module 122 may use the virtual identifier to identify communications from virtual machine 114.

In some embodiments, network-access-control module 122 may not support a direct interface. In such embodiments, proxy agent 112 may create a temporary interface that is configured to facilitate communication between network-access-control module 122 and virtual machine 114. For example, proxy agent 112 may temporarily bind virtual machine 114 to a new media-access-control address. Thus, virtual machine 114 may appear to network-access-control module 122 as another host on the network and may be evaluated as a host that is separate from host computing device 110.

Network-access-control module 122 may provide various network access control functions. For example, network-access-control module 122 may implement end-point evaluation technologies that assess the state (checks if they are compliant or non-compliant with policy) of the endpoints (e.g., virtual machine 114) attempting to access the network. In other words, network-access-control module 122 may act as a gate or door that permits or denies virtual machines and other devices access to the network. A network administrator may create, edit and/or manage network access control rules or policies implemented by network-access-control module 122.

Network-access-control module 122 may enforce end-point security policies on virtual machine 114. For example, if virtual machine 114 does not comply with network security policies, network-access-control module 122 may block or quarantine virtual machine 114 from accessing the network and network resources. Network-access-control module 122 may also test the integrity of virtual machine 114 against pre-defined templates, such as patch level, service packs, antivirus, and personal firewall status. In some embodiments, network-access-control module 122 may use custom-created checks.

Network-access-control module 122 may also perform automatic remediation of virtual machine 114 if virtual machine 114 is not compliant with network policies. The automatic remediation may be fully transparent to a user of virtual machine 114. In other embodiments, network-access-control module 122 may provide remediation information to the user for manual remediation. Network-access-control module 122 may check virtual machine 114 for antivirus software, anti-spyware, installed patches, and various other security settings.

Figure 2:
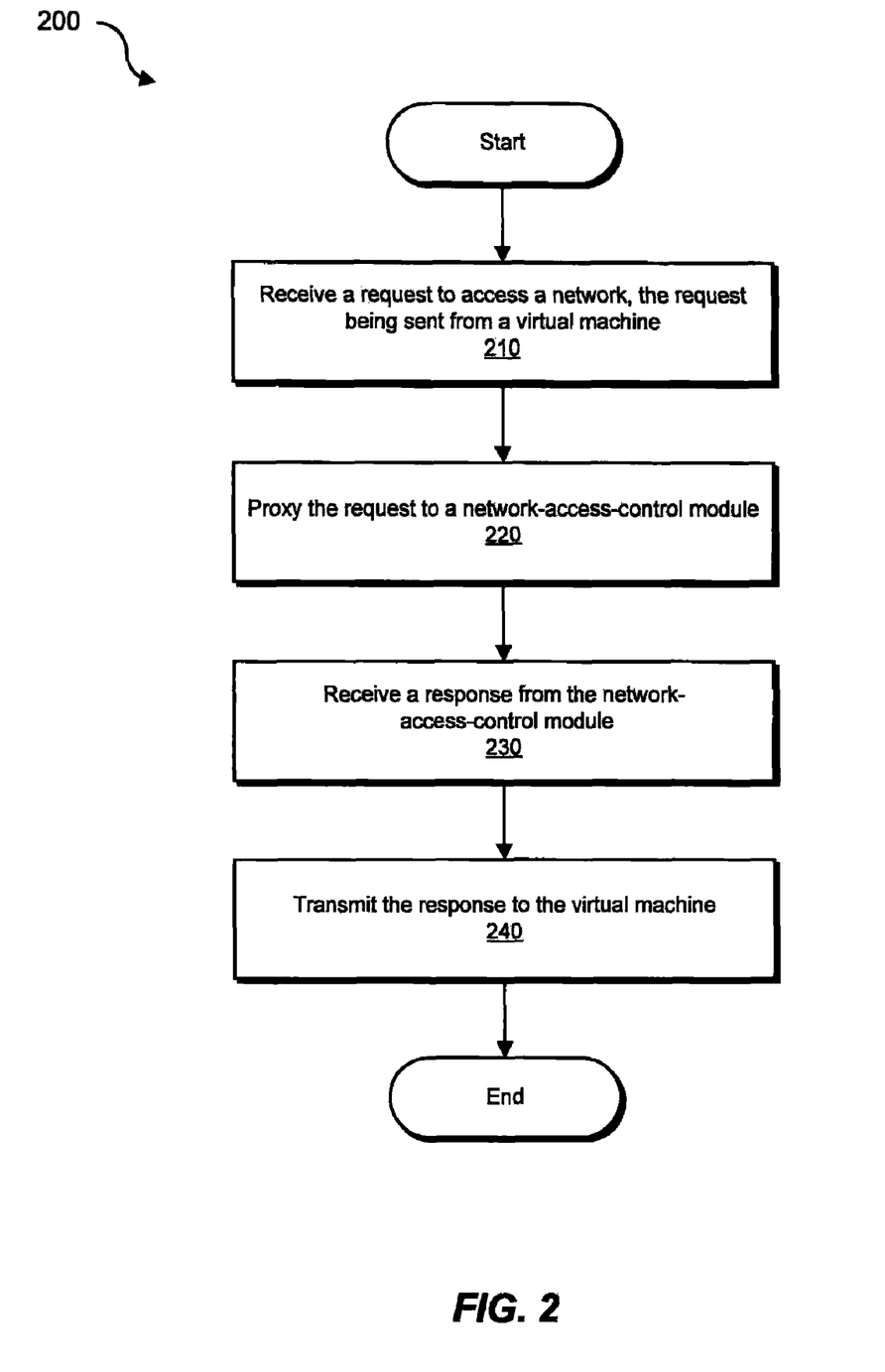
FIG. 2 is a flow diagram of an exemplary method for enforcing network access control in a virtual environment.

FIG. 2 illustrates a computer-implemented method 200 for enforcing network access control in a virtual environment. An agent, such as proxy agent 112, may receive a request to access a network (step 210). The agent may be programmed to identify which virtual machine (when multiple virtual machines are running) sent the request.

The agent may proxy the request to a network-access-control module (step 220). In some embodiments, the agent may proxy the request to a network-access-control module by relaying the request, along with a virtual identifier of the virtual machine, to the network-access-control module. In other embodiments, the agent may proxy the request to the network-access-control module by creating a temporary interface to handle communications between the network-access-control module and the virtual machine.

In some embodiments, the agent may then receive a response from the network-access-control module (step 230) and transmit the response to the virtual machine (step 240). The response may comprise authentication information, configuration information, or any other security policy information or network-access-control information. Authentication information may comprise a request that the virtual machine verifies its identity or may comprise any other type of authentication request. Configuration information may comprise a request about the security software installed and enabled on the virtual machine. Configuration information may also comprise a request about other configuration details of the virtual machine.

Figure 3:
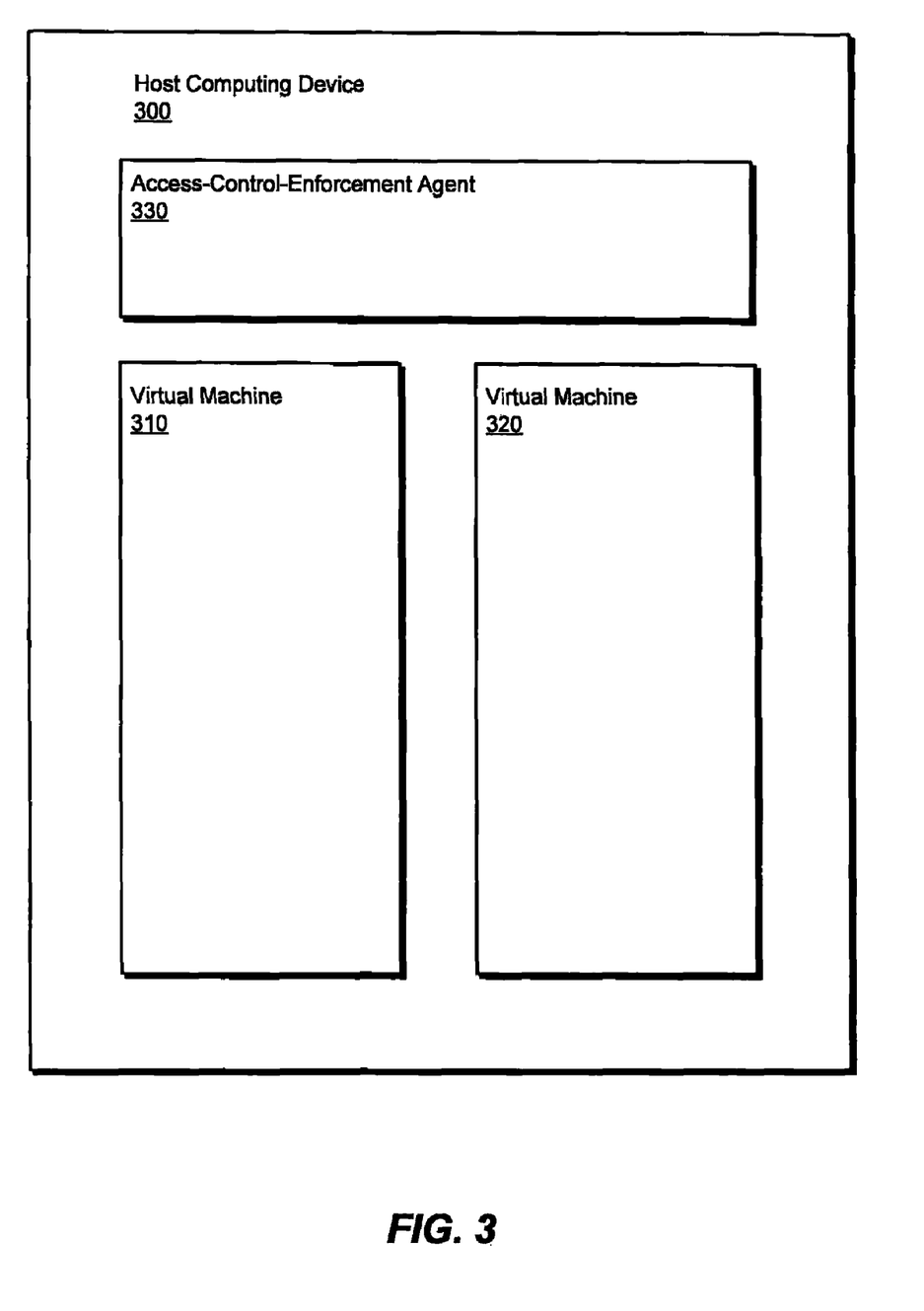
FIG. 3 is a block diagram of an exemplary host computing device with multiple virtual machines according to certain embodiments.

The agent may be a gateway enforcer (e.g., an in-line enforcement appliance deployed at network choke points) capable of controlling and blocking the flow of traffic from the virtual machine based on the virtual machine's compliance with established policies. The agent may apply gateway enforcement at Wide Area Network (WAN) links, or Virtual Private Network (VPN) connections, or on internal segments in a network. The network-access-control agent may also be a Dynamic Host Configuration Protocol (DHCP) enforcement tool, a Local Area Network (LAN) enforcement tool, or any other network-access-control tool FIG. 3 shows a host computing device 300 with an access-control-enforcement agent 330 and virtual machines 310 and 320. Access-control-enforcement agent 330 may be any computer executable code or application capable of enforcing access control on virtual machines. Access-control-enforcement agent 330 may receive a request from first virtual machine 310 to access a network. The network may be a virtual network (e.g., virtual machine 310 may be attempting to communicate with virtual machine 320).

Access-control-enforcement agent 330 may enforce a network access policy on virtual machine 310 even though communications between virtual machine 310 and 320 may not go through a physical network. In other words, network access control may be applied to communications between virtual machines (i.e., communications that would not otherwise go through traditional hardware that may be used in network access control). In other embodiments, network access control may also be applied to various other inter-process communications.

As an example, access-control-enforcement agent 330 may enforce a network control policy on virtual machine 310 by determining whether virtual machine 310 has adequate anti-virus software installed and enabled. If virtual machine 310 has adequate anti-virus software installed and enabled, access-control-enforcement agent 330 may allow virtual machine 310 to communicate with virtual machine 320. If virtual machine 310 does not have adequate anti-virus software installed and enabled, access-control-enforcement agent 330 may not allow virtual machine 310 to communicate with virtual machine 320.

In other embodiments, access-control-enforcement agent 330 may enforce network access control on communications from virtual machine 310 and/or virtual machine 320 to an outside physical network. In other words, access-control-enforcement agent 330 may perform the same function as network-access-control module 122 in FIG. 1. Thus, instead of proxying communications to an external network-control-access module, host computing device 300 may apply network access control through access-control-enforcement agent 330.

Figure 4:
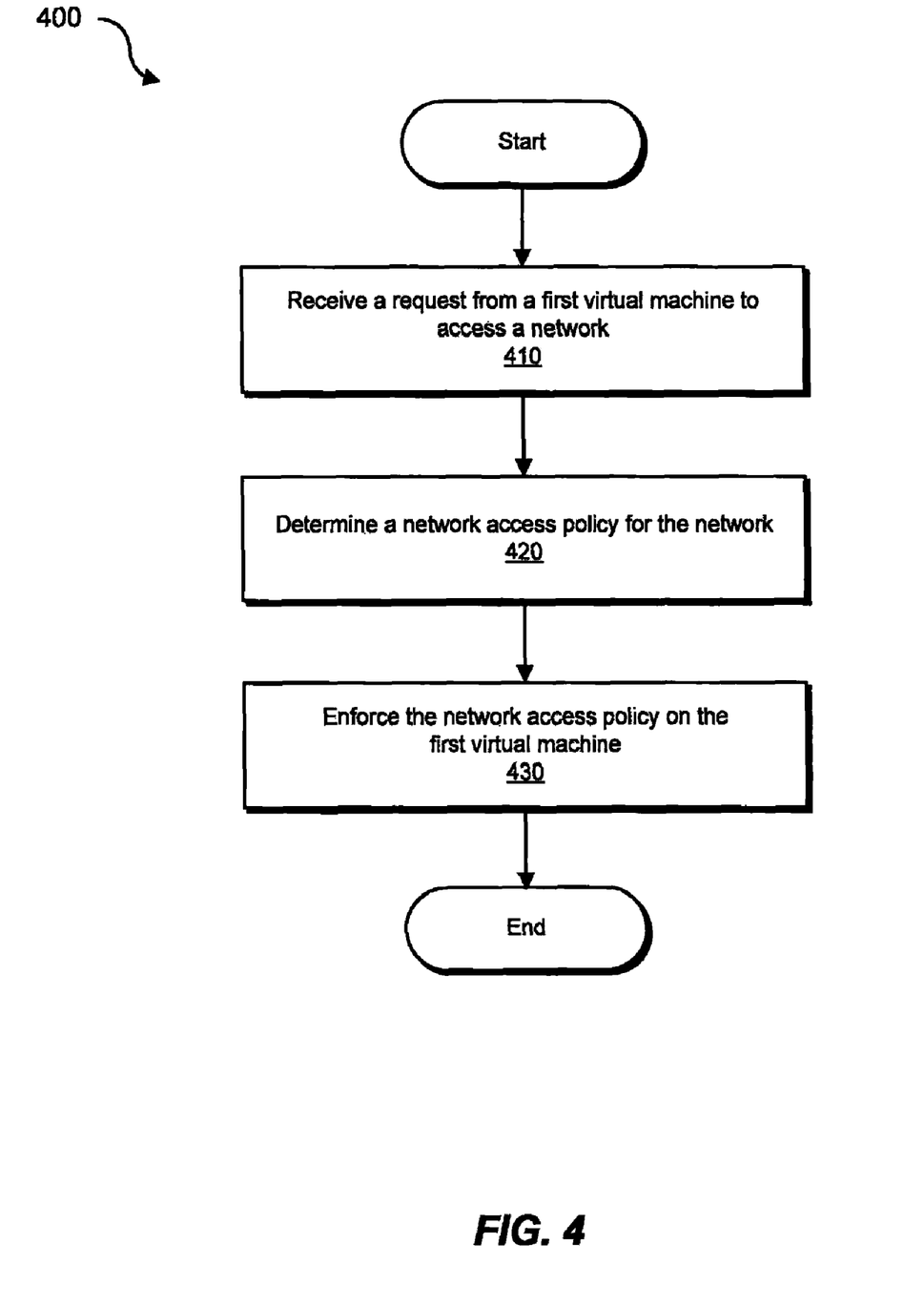
FIG. 4 is a flow diagram of an exemplary method for enforcing network access control in a virtual environment.

FIG. 4 is a flow diagram of a method 400 of applying network access control in a virtual environment. An agent may receive a request form a first virtual machine to access a network (step 410). The agent may determine a network access policy for the network (step 420). The agent may determine a network access policy by querying a local or remote policy database or through any other acquisition means. After determining the network access policy, the agent may enforce the network access policy on the first virtual machine (step 430). The agent may enforce the network policy by denying access to the network, allowing access to the network, quarantining the virtual machine, or by using any other network access control mechanism.

Figure 5:
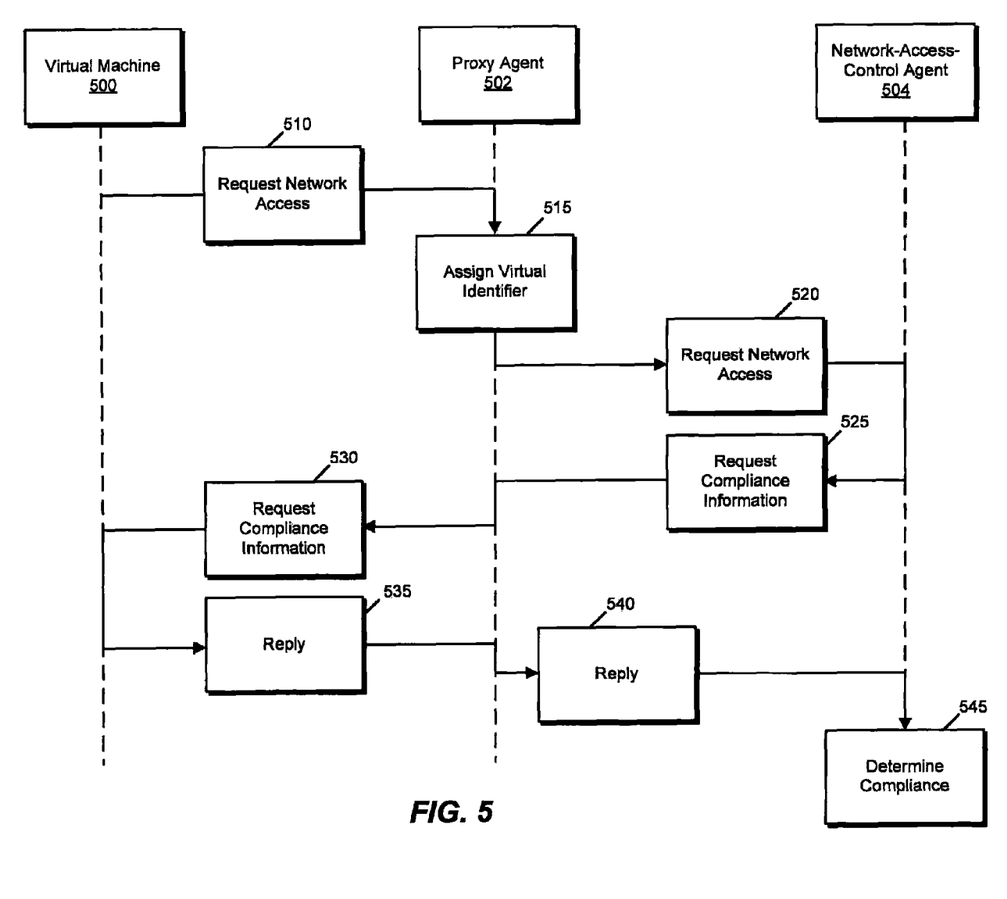
FIG. 5 is a flow diagram of exemplary communications between a virtual machine, a proxy agent, and a network-access-control agent.

FIG. 5 shows communications between a virtual machine 500, a proxy agent 502, and a network-access-control agent 504. Virtual machine 500 may request network access (510). In response, proxy agent 502 may assign a virtual identifier to virtual machine 500 (step 515). Proxy agent 502 may also assign a virtual identifier to virtual machine 500 at any other time before virtual machine 500 attempts to access the network. Proxy agent. 502 may proxy the request by sending the request to access the network to network-access-control agent 504 (step 520). Network-access-control agent 504 may request compliance information about virtual machine 500 (step 525).

Proxy agent 502 may transmit this request to virtual machine 500 (step 530). Virtual machine 500 may reply (step 535) and proxy agent 502 may relay the reply to network-access-control agent 504 (step 540). Then, network-access-control agent 504 may determine whether virtual machine 500 is compliant (step 545). In other embodiments, network-access-control agent 504 may determine whether virtual machine 500 is compliant by remotely scanning virtual machine 500. If virtual machine 500 is compliant, network-access-control agent 504 may allow virtual machine 500 to access the network. If virtual machine 500 is not compliant, network-access-control agent 504 may not allow virtual machine 500 to access the network.

Enforcement evaluation technologies, such as network-access-control agent 504, may report to and receive configuration policy information from an endpoint protection manager, where policies may be created, edited, and managed. Embodiments of the instant disclosure may allow access control to validate and enforce policy compliance for all types of endpoints in virtual environments. This validation and enforcement process may begin prior to a virtual machine's connection to the network and may continue throughout the duration of the connection, with policies serving as the basis for all evaluations and actions.

Network access control may protect the network from malicious code on a virtual machine and from unknown or unauthorized virtual machines by verifying that virtual machines connecting to the network are configured properly. Network access control may prevent propagation of malicious code such as viruses, worms, spyware, and other forms of malware, and may offer greater network availability and reduce disruption of services for users. Network access control may also provide verifiable organizational compliance information for virtual machines through real-time compliance checking and verification that end-point security investments, such as antivirus and client firewall programs, are properly enabled.

Figure 6:
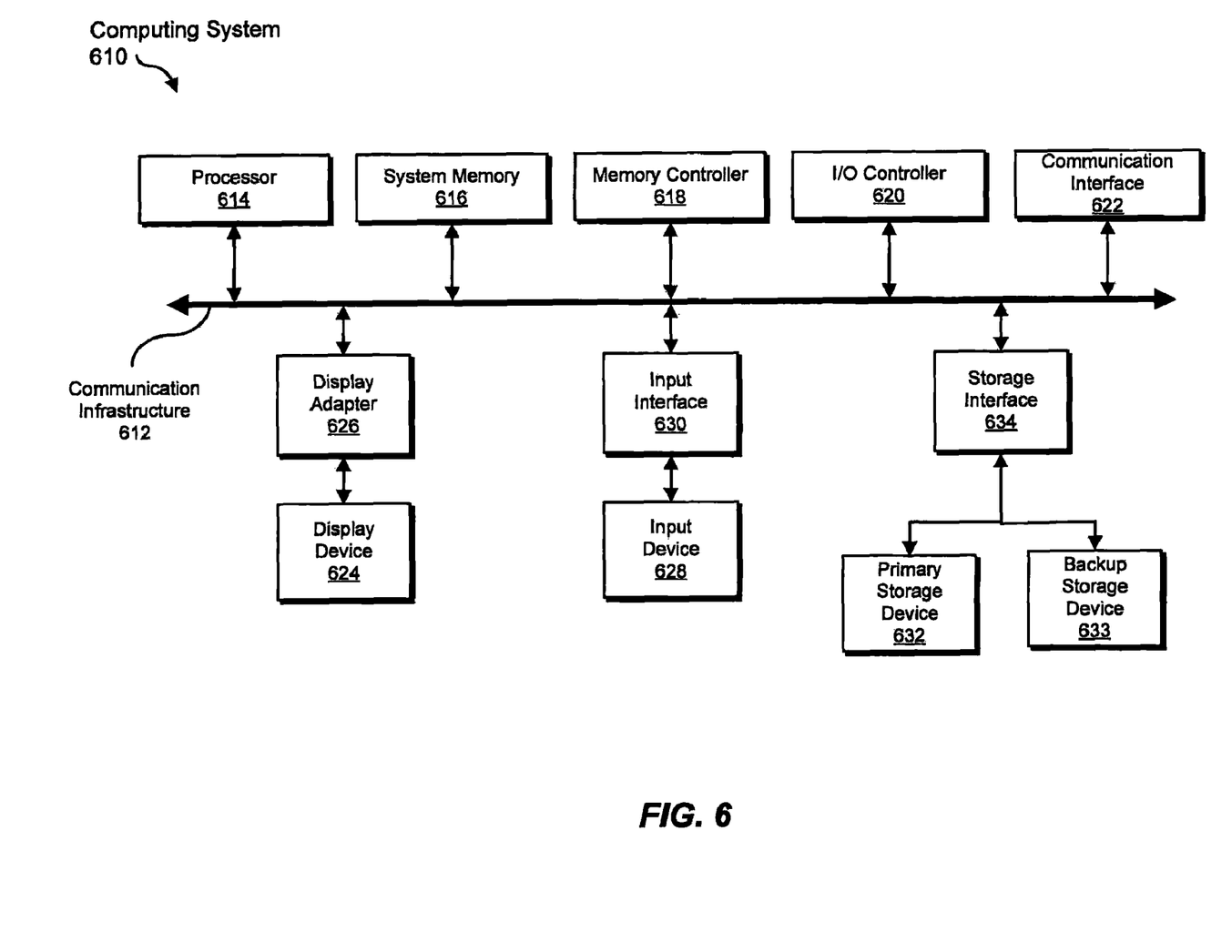
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the receiving, proxying, transmitting, creating, binding, determining, enforcing, allowing, and/or denying steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as receiving, proxying, transmitting, creating, binding, determining, enforcing, allowing, and/or denying.

I/O controller 620 generally represents any type or form of module capable of coordinating and/or controlling the input and output functions of a computing device. For example, in certain embodiments I/O controller may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the receiving, proxying, transmitting, creating, binding, determining, enforcing, allowing, and/or denying steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the receiving, proxying, transmitting, creating, binding, determining, enforcing, allowing, and/or denying steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the receiving, proxying, transmitting, creating, binding, determining, enforcing, allowing, and/or denying steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the receiving, proxying, transmitting, creating, binding, determining, enforcing, allowing, and/or denying steps disclosed herein. Storage devices 632 and 633 may also be used to perform and/or be a means for performing other steps and features set forth in the instant disclosure.

Many other devices or subsystems may be connected to computing system 710. Conversely, all of the components and devices illustrated in FIG. 6 need not be present to practice the embodiments descried and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a software application (also referred to as computer software, software applications, computer-readable instructions, or computer control logic) on a computer-readable medium. Examples of computer-readable media include physical media, such as magnetic-storage media (e.g., hard disk drives and floppy disks), optical-storage media (e.g., CD- or DVD-ROMs), electronic-storage media (e.g., solid-state drives and flash media), and other physical media.

The computer-readable medium containing the software application may be loaded into computing system 610. All or a portion of the software application stored on the computer-readable medium may then be stored in system memory 616 and/or various portions of storage devices 632 and 633. When executed by processor 614, a software application loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
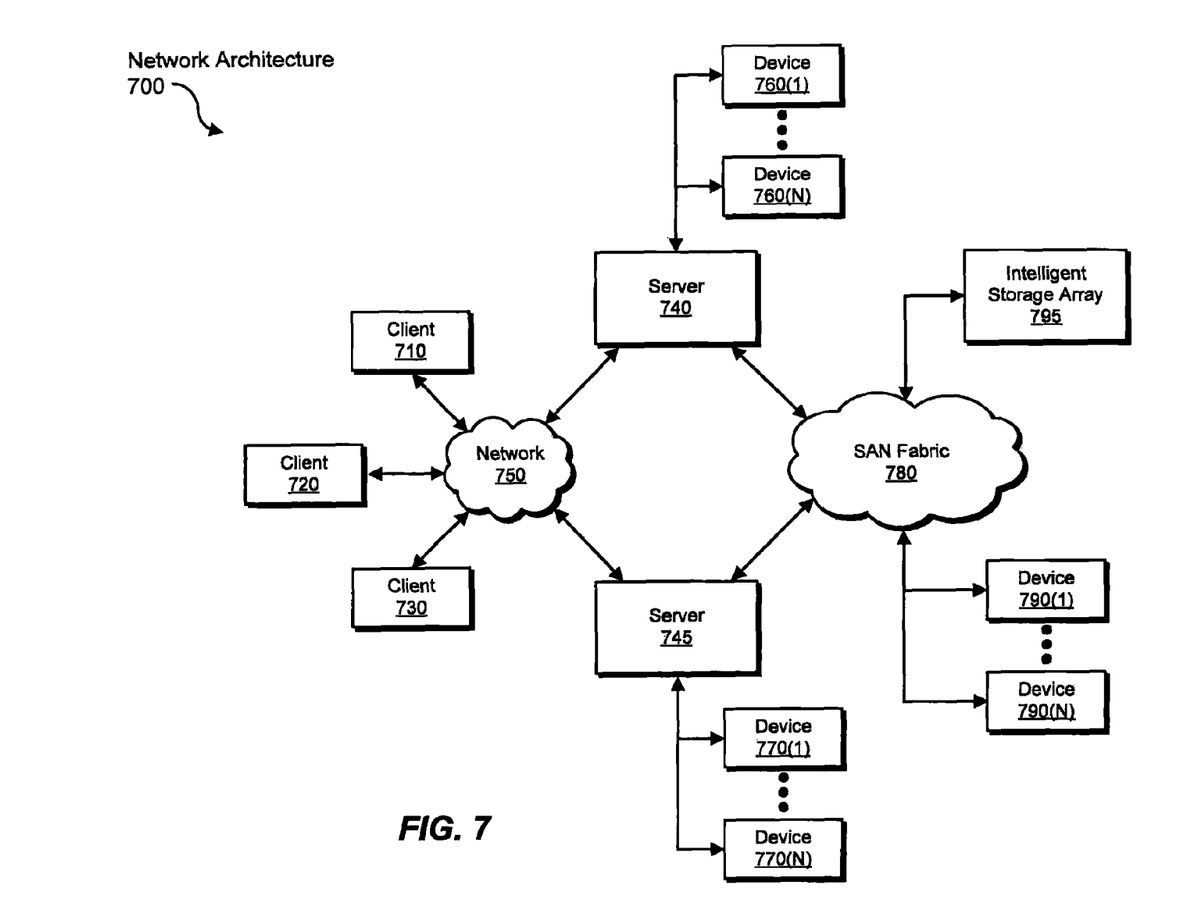
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network. (WAN), a local area network. (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and intelligent storage array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a software application and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a software application, stored in server 740, run by server 745, and distributed to client systems 710, 720, and 730 over network 750. Accordingly, network architecture 700 may perform and/or be a means for performing, either alone or in combination with other elements, one or more of the receiving, proxying, transmitting, creating, binding, determining, enforcing, allowing, and/or denying steps disclosed herein.

As detailed above, computing system 610 and/or one or more components of network architecture 700 may perform and/or be means for performing, either alone or in combination with other elements, one or more steps of the exemplary computer-implemented methods described and/or illustrated herein. According to certain embodiments, the computer implemented method may comprise receiving a request to access a network. The request may be sent from a virtual machine. The method may comprise proxying the request to a network-access-control module, receiving a response from the network-access-control module, and transmitting the response to the virtual machine.

In some embodiments, proxying the request to the network-access-control module may comprise assigning the virtual machine a virtual identifier. The virtual identifier may comprise an identifier of a host that is proxying the request and an extension to the identifier of the host. The identifier of the host may comprise a media-access-control address of the host.

In some embodiments, proxying the request may comprise creating a temporary interface. The temporary interface may be configured to receive the response from the network-access-control module and transmit the response to the virtual machine. In some embodiments, creating the temporary interface may comprise temporarily binding the temporary interface to a new media-access-control address. In various embodiments, the response may comprise at least one of authentication information, configuration information, and/or other security policy information.

In at least one embodiment, a computer-implemented method may comprise receiving a request from a first virtual machine to access a network, determining a network access policy for the network, and enforcing the network access policy on the first virtual machine. In some embodiments, the network may be a virtual network and the request from the first virtual machine may be a request to communicate with a second virtual machine over a virtual network.

In various embodiments, the network may be a physical network, and an enforcement agent running on the host may enforce the network access policy. In at least one embodiment, enforcing the network access policy on the first virtual machine may comprise determining whether the first virtual machine is compliant with the network access policy. If the first virtual machine is compliant with the network access policy, the method may comprise allowing the first virtual machine to access the network. If the first virtual machine is not compliant with the network access policy, the method may comprise denying the first virtual machine access to the network. In various embodiments, the request may comprise an inter-process communication.

According to various embodiments, a computer-readable medium may comprise one or more computer-executable instructions that, when executed by a computing device, may cause the computing device to receive a request to access a network. The request may be sent from a virtual machine. One or more computer-executable instructions may also be programmed to cause the computing device to proxy the request to a network-access-control module, receive a response from the network-access-control module, and transmit the response to the virtual machine.

In some embodiments, the one or more computer-executable instructions may be further operable to proxy the request to the network-access-control module by assigning the virtual machine a virtual identifier. The virtual identifier may comprise an identifier of a host that is proxying the request. The virtual identifier may also comprise an extension to the host's identifier. In some embodiments, the host's identifier may comprise a media-access-control address.

According to various embodiments, the one or more computer-executable instructions may be further operable to create a temporary interface. The temporary interface may be configured to receive the response from the network-access-control module and transmit the response to the virtual machine. In some embodiments, the one or more computer-executable instructions may be further operable to temporarily bind the virtual machine to a media-access-control address. In various embodiments, the response may comprise at least one of authentication information, configuration information, and/or security policy information.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media (storage and/or communication media) used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

We claim:

1. A computer-implemented method for enforcing network access control in a virtual environment, the computer-implemented method comprising:
   receiving a request to access a network, the request being sent from a virtual machine;
   proxying the request to a network-access-control module;
   receiving a response from the network-access-control module;
   transmitting the response to the virtual machine.

2. The computer-implemented method of claim 1, wherein:
   proxying the request to the network-access-control module comprises assigning the virtual machine a virtual identifier.

3. The computer-implemented method of claim 2, wherein:
   the virtual identifier comprises:
      an identifier of a host that is proxying the request, and
      an extension to the identifier of the host.

4. The computer-implemented method of claim 3, wherein:
   the identifier of the host comprises a media-access-control address.

5. The computer-implemented method of claim 1, wherein proxying the request comprises:
   creating a temporary interface, the temporary interface being configured to facilitate communication between the network-access-control module and the virtual machine.

6. The computer-implemented method of claim 5, wherein creating the temporary interface comprises:
   temporarily binding the virtual machine to a new media-access-control address.

7. The computer-implemented method of claim 1, wherein the response comprises at least one of:
   authentication information;
   configuration information;
   security policy information.

8. A computer-implemented method for enforcing network access control in a virtual environment, the computer-implemented method comprising:
   receiving a request from a first virtual machine to access a network;
   determining a network access policy for the network;
   enforcing the network access policy on the first virtual machine.

9. The computer-implemented method of claim 8, wherein:
   the network is a virtual network;
   the request from the first virtual machine is a request to communicate with a second virtual machine over the virtual network.

10. The computer-implemented method of claim 8, wherein:
    the network is a physical network;
    an enforcement agent running on a host enforces the network access policy;
    the first virtual machine is running on the host.

11. The computer-implemented method of claim 8, wherein:
    enforcing the network access policy on the first virtual machine comprises determining whether the first virtual machine is compliant with the network access policy.

12. The computer-implemented method of claim 11, further comprising:
    allowing the first virtual machine to access the network if the first virtual machine is compliant with the network access policy;
    denying the first virtual machine access to the network if the first virtual machine is not compliant with the network access policy.

13. The computer-implemented method of claim 8, wherein:
    the request comprises an inter-process communication.

14. A non-transitory computer-readable medium comprising one or more computer-executable instructions that, when executed by a computing device, cause the computing device to:
    receive, at a proxy agent, a request to access a network, the request being sent from a virtual machine;
    proxy, by the proxy agent, the request to a network-access-control module;
    receive, at the proxy agent, a response from the network-access-control module that requests compliance information from the virtual machine;
    transmit, via the proxy agent, the response to the virtual machine.

15. The non-transitory computer-readable medium of claim 14, wherein the one or more computer-executable instructions are further operable to:
    proxy the request to the network-access-control module by assigning the virtual machine a virtual identifier.

16. The non-transitory computer-readable medium of claim 15, wherein:
    the virtual identifier comprises:
       an identifier of a host that is proxying the request, and
       an extension to the identifier of the host.

17. The non-transitory computer-readable medium of claim 14, further comprising:
    receiving, at the proxy agent and from the virtual machine, compliance information of the virtual machine;
    transmitting, from the proxy agent, the compliance information of the virtual machine to the network-access-control module.

18. The non-transitory computer-readable medium of claim 14, wherein the one or more computer-executable instructions are further operable to:
    create a temporary interface, the temporary interface being configured to facilitate communication between the virtual machine and the network-access-control module.

19. The non-transitory computer-readable medium of claim 18, wherein the one or more computer-executable instructions are further operable to:
    temporarily bind the virtual machine to a new media-access-control address.

20. The non-transitory computer-readable medium of claim 14, wherein the response comprises at least one of:
    authentication information;
    configuration information;
    security policy information.

* * * * *